United States Patent
Lee et al.

(10) Patent No.: US 9,322,305 B2
(45) Date of Patent: Apr. 26, 2016

(54) CONTROL METHOD FOR OIL PUMP

(71) Applicants: Hyundai Motor Company, Seoul (KR); Kia Motors Corporation, Seoul (KR)

(72) Inventors: Hak Sung Lee, Gyeonggi-Do (KR); Sang Hyun Jeong, Gyeonggi-Do (KR); Sang Lok Song, Gyeonggi-Do (KR); Jae Shin Yi, Gyeonggi-Do (KR); Yoh Han Kim, Seoul (KR); Jong Ho Lee, Gyeonggi-Do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 14/553,948

(22) Filed: Nov. 25, 2014

(65) Prior Publication Data
US 2016/0084125 A1 Mar. 24, 2016

(30) Foreign Application Priority Data
Sep. 19, 2014 (KR) .......... 10-2014-0124865

(51) Int. Cl.
- F01M 1/02 (2006.01)
- F01M 1/16 (2006.01)
- G01L 1/02 (2006.01)
- G06N 99/00 (2010.01)
- F16H 61/00 (2006.01)

(52) U.S. Cl.
CPC . F01M 1/16 (2013.01); F01M 1/02 (2013.01); G01L 1/02 (2013.01); G06N 99/005 (2013.01); F01M 2001/0215 (2013.01); F16H 2061/0087 (2013.01); F16H 2061/0096 (2013.01)

(58) Field of Classification Search
None
See application file for complete search history.

(56) References Cited

U.S. PATENT DOCUMENTS

| | | | | |
|---|---|---|---|---|
| 5,743,826 A | * | 4/1998 | Usuki | F16H 61/08 477/120 |
| 2012/0137993 A1 | * | 6/2012 | Kim | F01P 7/165 123/41.11 |
| 2013/0049941 A1 | * | 2/2013 | Otanez | F16H 61/0251 340/438 |
| 2013/0134004 A1 | * | 5/2013 | Hwang | F16H 61/00 192/3.33 |
| 2014/0190444 A1 | * | 7/2014 | Inoue | F01M 1/16 123/196 R |

FOREIGN PATENT DOCUMENTS

| | | |
|---|---|---|
| JP | 4948204 B2 | 6/2012 |
| JP | 2012-247404 A | 12/2012 |
| JP | 5286425 B2 | 9/2013 |
| KR | 10-2009-0045990 A | 5/2009 |

(Continued)

OTHER PUBLICATIONS

Jeong, H.S. et al., "Development of the Oil Consumption Rate Test Method and Measurement Data Analysis for an Automatic Transmission System", Jrl. of Fluid Power Systems Society, vol. 6 (Mar. 2009) pp. 10-16.

(Continued)

*Primary Examiner* — Justin Holmes
(74) *Attorney, Agent, or Firm* — Mintz Levin Cohn Ferris Glovsky and Popeo, P.C.; Peter F. Corless

(57) ABSTRACT

A system and method of controlling an automotive electric oil pump are provided. The method of controlling an oil pump can minimize power consumption of a vehicle and improve the fuel efficiency accordingly by learning the performance of the electric oil pump and operating the electric oil pump based on performance.

14 Claims, 5 Drawing Sheets

(56) References Cited

FOREIGN PATENT DOCUMENTS

| KR | 10-2011-0062922 A | 6/2011 |
| KR | 10-2012-0063258 A | 6/2012 |
| KR | 10-1272923 B1 | 6/2013 |
| KR | 10-2014-0048582 A | 4/2014 |

OTHER PUBLICATIONS

Song, M. et al "Development of Electric Oil Pump Control Logic for 6-Speed Automatic Transmission based HEV during Mode Change", Winter Conference of Automotive Engineering Association (Nov. 2010).

* cited by examiner

CONTROL METHOD FOR OIL PUMP

CROSS REFERENCE TO RELATED APPLICATION

The present application claims priority of Korean Patent Application Number 10-2014-0124865 filed on Sep. 19, 2014, the entire contents of which application are incorporated herein for all purposes by this reference.

BACKGROUND

1. Field of the Invention

The present invention, in general, relates to a method and system of controlling an oil pump, and, more particularly, to a method and system of controlling an automotive electric oil pump.

2. Description of the Related Art

Vehicles are equipped with a plurality of oil pumps, and recently, an electric oil pump of which the operation is controlled based on the running state of a vehicle is increasingly used due to various requirements. Such oil pumps generally have an operation mechanism that pumps oil by rotating gears or vanes, thus causing differences in quality due to mechanical tolerances of the gears or the pump housing.

FIG. 1 is an exemplary graph showing the relationships between revolutions per minute (RPM) and generated pressure according to the quality of the electric oil pumps of the related art, showing the relationships between the RPM and the generated pressure of a highest-quality product with a highest quality, a lowest-quality product with a lowest quality, and a middle-quality product a middle quality. Referring to FIG. 1, when devices, such as a transmission, which use the electric oil pumps generate a desired pressure, the RPM of the electric oil pumps may vary due to the qualities thereof, and the difference may cause a difference in power consumption of the electric oil pumps and a difference in fuel efficiency of vehicles equipped with the electric oil pumps.

In the mass production of vehicles, it may be difficult to determine the difference in quality of the electric oil pumps mounted on the vehicle. Accordingly, in the design of a predetermined type of vehicles, the control of RPM of the electric oil pump may be designed to be based on a lowest-quality product to prevent issues with the vehicles equipped with a worst product. However, in this case, the fuel efficiency of vehicles equipped with a highest- or middle-quality electric oil pump decreases due to unnecessary power consumption. Further, since the quality of a predetermined type of electric oil pumps is about the same as the quality of the type of middle-quality product, electric oil pumps of over about 70~80% mounted on a predetermined type of vehicles have quality at least beyond the middle-quality product. Therefore, FIG. 1 shows that when RPM of electric oil pumps is controlled based on some low-quality products, many vehicles equipped with electric oil pumps greater than the middle-quality product unnecessarily consume power and the fuel efficiency decreases. In other words, vehicles that are manufactured based on parameters of electric oil pumps that are known to underperform, fuel efficiency may decrease when an electric oil pump of higher quality is actually used within the vehicle.

The foregoing is intended merely to aid in the understanding of the background of the present invention, and is not intended to mean that the present invention falls within the purview of the related art that is already known to those skilled in the art.

SUMMARY

Accordingly, the present invention provides a system and a method of controlling an oil pump which may minimize power consumption of a vehicle and improve the fuel efficiency accordingly, by learning the performance of the electric oil pump and controlling the electric pump in accordance with the performance.

According to one aspect of the present invention, a method of controlling an oil pump may include: determining, by a controller, whether learning conditions for learning necessary RPM according to quality of an electric oil pump are satisfied; operating, by the controller, the electric oil pump at an RPM for a standby state (e.g., a baseline) according to a current oil temperature, when the learning conditions are satisfied; measuring, by the controller, hydraulic pressure generated when the electric oil pump is operated at predetermined leaning-objective RPM from the standby state generated in the operation of the electric oil pump; and generating, by the controller, a new learning map proportional to a difference between the hydraulic pressure measured in the measuring of hydraulic pressure and the hydraulic pressure of predetermined standard maps, by comparing the measured hydraulic pressure with the hydraulic pressure of the standard maps.

According to the present invention, it may be possible to minimize power consumption of a vehicle and improve the fuel efficiency accordingly, by learning the performance of the electric oil pump and controlling it in accordance with the electric oil pump performance.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
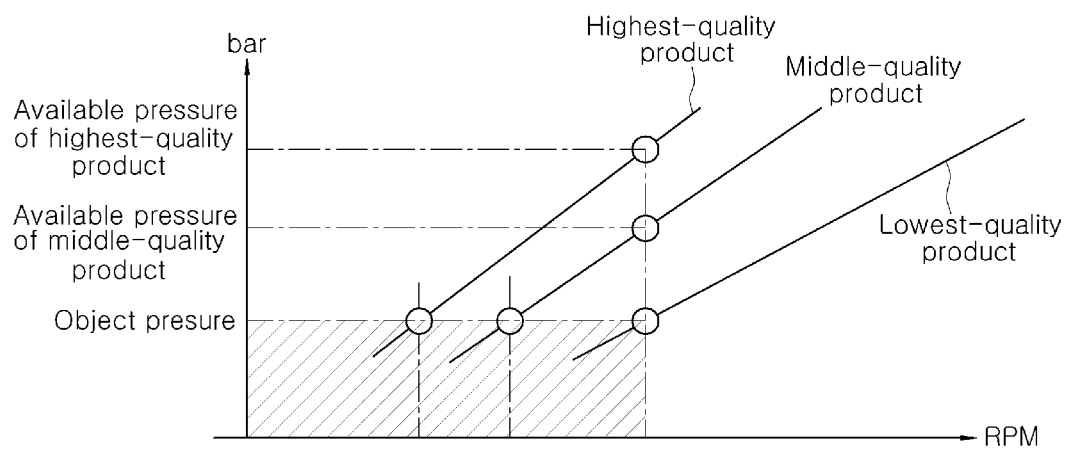
FIG. 1 is an exemplary graph showing and comparing the relationships between RPM and generated pressure according to the quality of electric oil pumps of the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, exemplary embodiments of the present invention will be described in detail with reference to the accompanying drawings.

Figure 2:
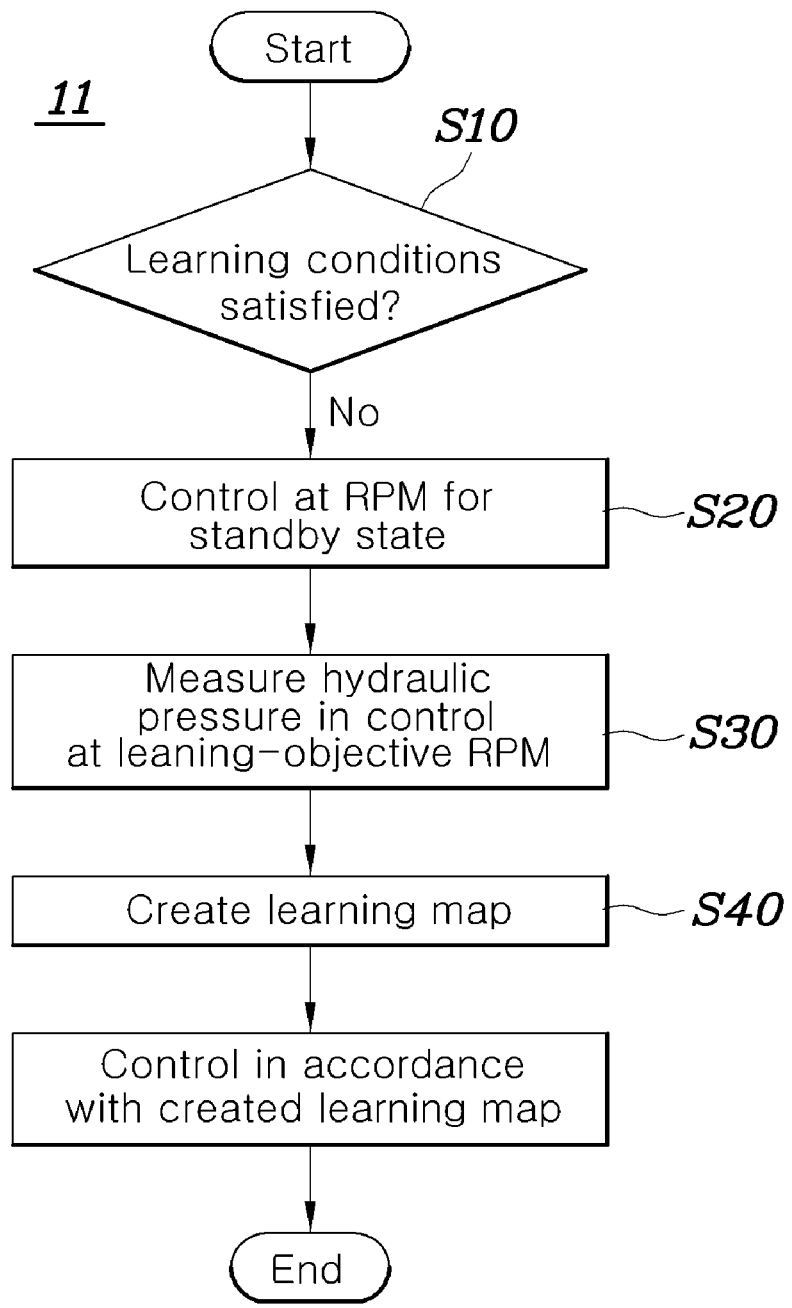
FIG. 2 is an exemplary flowchart showing a method of controlling an oil pump according to an exemplary embodiment of the present invention.

Referring to FIG. 2, an exemplary embodiment of a method of controlling an oil pump of the present invention may include: determining, by a controller 11, whether learning conditions for learning a necessary RPM based on the quality of an electric oil pump are satisfied (S10); operating, by the controller 11, the electric oil pump at an RPM for a standby state (e.g., a baseline) based on the current oil temperature, when the learning conditions are satisfied (S20); measuring, by the controller 11, hydraulic pressure generated when the electric oil pump is operated at predetermined leaning-objective RPM from the standby state generated in the operation of the electric oil pump (S30); and generating, by the controller 11, a new learning map proportional to the difference between the hydraulic pressure measured in the measuring of hydraulic pressure and the hydraulic pressure of predetermined standard maps, by comparing the measured hydraulic pressure with the hydraulic pressure of the standard maps (S40).

A sensor may be configured to measure hydraulic pressure generated by the electric oil pump in the measuring of hydraulic pressure. The sensor may be a hydraulic pressure sensor configured to receive hydraulic pressure from the electric oil pump and may be mounted on a hydraulic device operated at a hydraulic pressure different from the hydraulic pressure discharged from the electric oil pump and may be configured to sense control pressure of the hydraulic device. In other words, the present invention may learn (e.g., detect and store, memorize, or the like) the performance difference caused by the quality of an electric oil pump in a hydraulic system, which may not monitor pressure discharged from an electric oil pump, using the hydraulic pressure sensor, under specific learning conditions, may be configured to generate a learning map, and then operate the electric oil pump based on the learning map, thereby preventing unnecessary power consumption of the electric oil pump.

Figure 3:
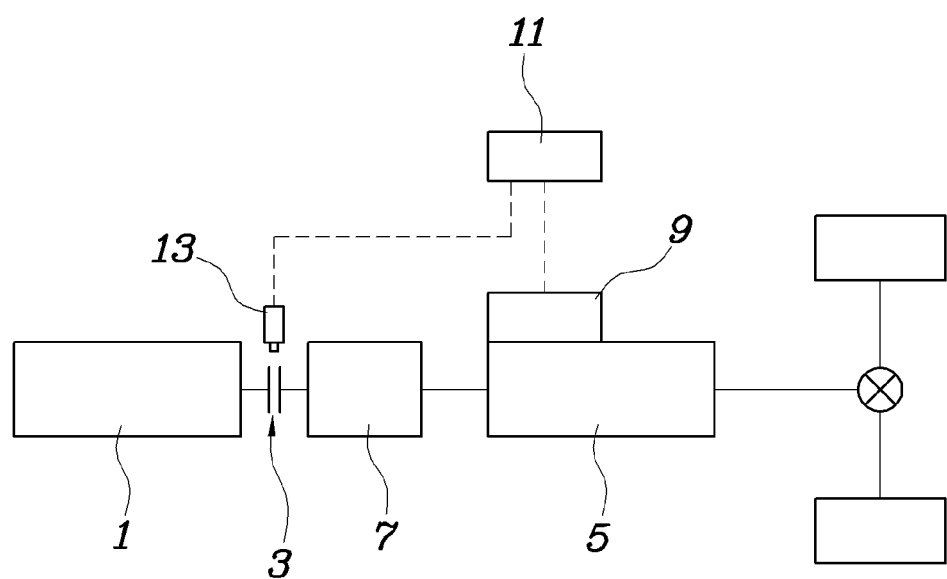
FIG. 3 is an exemplary diagram showing the configuration of a vehicle to which the present invention may be applied according to an exemplary embodiment of the present invention.

FIG. 3 is conceptually shows an example of the configuration of a hybrid vehicle to which the present invention may be applied. Power from an engine 1 may be input to a transmission 5 through an engine clutch 3, a motor 7 may be connected to the transmission, an electric oil pump 9 may be configured to supply oil to the transmission, the electric oil pump operated by a controller 11, hydraulic pressure from the electric oil pump may be appropriately adjusted and supplied to the engine clutch 3, and the control hydraulic-pressure supplied to the engine clutch may be measured by a hydraulic pressure sensor 13 for more accurate control of the engine clutch. The transmission may be supplied with necessary hydraulic pressure from the electric oil pump without a specific mechanical oil pump being required.

Assuming that the present invention is applied to the configuration shown in FIG. 3, the hydraulic device as described in the exemplary embodiments of the present invention corresponds to the engine clutch and the hydraulic pressure sensor may be a sensor configured to measure the control hydraulic-pressure for operating the engine clutch. In the determination of whether learning conditions are satisfied, the controller may be configured to determine the pressure for controlling the hydraulic device is not required to be measured because the hydraulic pressure is not operated and thus the controller may be configured to determine whether the oil temperature is within a predetermined range, and then when the hydraulic pressure sensor is available for measuring pressure discharged from the electric oil pump (e.g., since it is not used to control the hydraulic device) and when the oil temperature is in the predetermined range, the controller may be configured to determine that the leaning conditions are satisfied.

In other words, in a vehicle having the configuration shown in FIG. 3, when the accelerator pedal is not operated with a park gear (P-gear) or a neutral gear (N-gear) of an engaged transmission and when the engine clutch is not required to operate after assembly or repair of the vehicle, the controller may be configured to determine that the pressure for controlling the hydraulic device is not required to be measured. Further, the learning may be possible when the oil temperature is in a predetermined range. However, learning may be difficult due to substantially high viscosity of the oil since the oil temperature is substantially lower (e.g., less than a predetermined oil temperature) than the oil temperature in the normal running state of a vehicle (e.g., when the vehicle is operating without failure). An abnormal state may also be determined when the oil temperature is substantially high, that is greater than a predetermined temperature. Accordingly, the range of the oil temperature may be set between about 40° C. to 100° C., for example.

In the operation of the electric oil pump at an RPM for a standby state (e.g., the baseline) the RPM that corresponds to the current oil temperature may be obtained from a first control map, in which the RPM for the standby state may be set in advance for each temperature, and then the electric oil pump may be operated. In the measuring of oil temperature, the RPM that corresponds to the current oil temperature may be obtained from a second control map, in which leaning-objective RPM may be set in advance for each temperature, and then hydraulic pressure may be measured while the electric oil pump is operated.

For reference, Table 1 is an example of the first control map and Table 2 is an example of the second map. Obviously, the first control map and the second control map may be implemented in one integrated map.

TABLE 1

| Oil temperature (° C.) | 40 | 60 | 80 | 100 |
|---|---|---|---|---|
| Number of revolution (RPM) | 200 | 400 | 600 | 800 |

TABLE 2

| Oil temperature (° C.) | 40 | 60 | 80 | 100 |
|---|---|---|---|---|
| Number of revolution (RPM) | 420 | 700 | 960 | 1300 |

The leaning-objective RPM of the second control map may be set to allow a middle-quality electric oil pump to generate hydraulic pressure for normal operation of an engine clutch that is the hydraulic device, at a predetermined temperature. For example, the engine clutch may require hydraulic pressure of about 12 bar for the normal operation (e.g., operation without error), the RPM of a middle-quality electric oil pump for generating hydraulic pressure of 12 bar at a predetermined temperature may be set to the leaning-objective RPM at each oil temperature. The RPM for the standby state of the first control map may be set such that hydraulic pressure may be measured with a clear (e.g., distinct) difference due to a change in an RPM of an electric oil pump between the operation of the electric oil pump at an RPM for a standby state and the measuring of hydraulic pressure.

In the measuring of hydraulic pressure, it may be possible to measure hydraulic pressure with the hydraulic pressure sensor, with the electric oil pump operating at the leaning-objective RPM based on oil temperature for several seconds (e.g., about two seconds but the invention is not limited thereto). In particular, it may be possible to repeat, several times, the measuring of hydraulic pressure with the electric oil pump operating at the leaning-objective RPM, decreasing the RPM to the RPM for the standby state, and then measuring hydraulic pressure again with the electric oil pump operating at the leaning-objective RPM, and to obtain and use the average in the generation of a new learning map.

Figure 4:
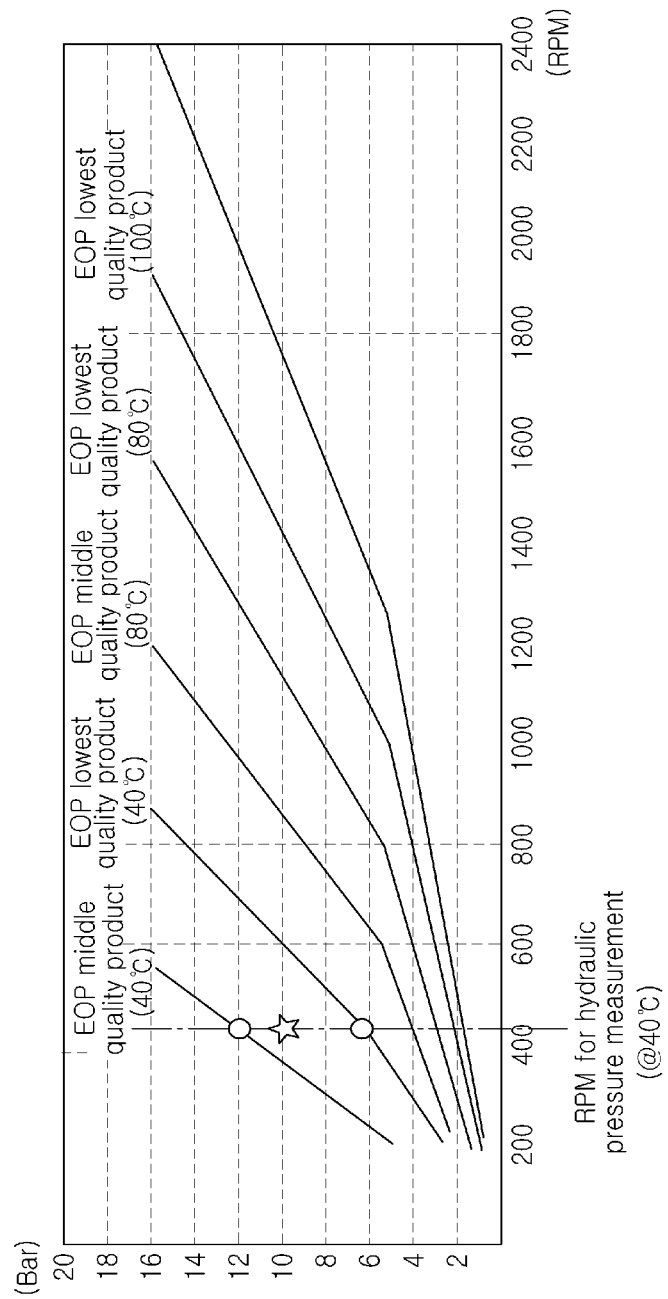
FIG. 4 is an exemplary graph showing a comparison of hydraulic pressure measured in measuring of hydraulic pressure with standard maps according to an exemplary embodiment of the present invention.

In the generation of a new learning map, the hydraulic pressure measured in the measuring of hydraulic pressure may be compared with the hydraulic pressure at about the same temperature in the standard maps and may be conceptually expressed, as in the graph of FIG. 4. The star in FIG. 4 shows hydraulic pressure measured in the measuring of hydraulic pressure, that is, shows that the current oil temperature is about 40° C. and the electric oil pump used for leaning has performance between a middle-quality product and a low-quality product.

Figure 5:
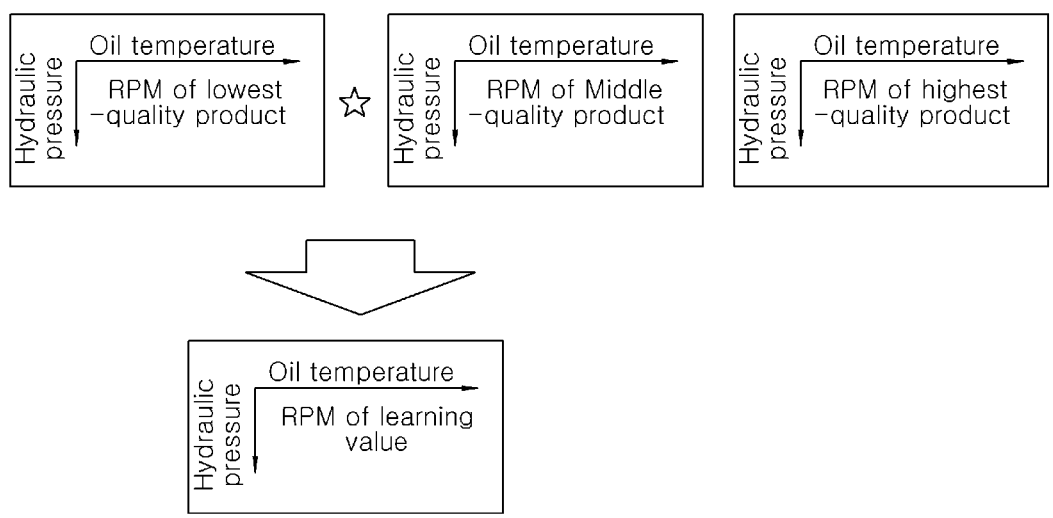
FIG. 5 is an exemplary diagram that illustrates generation of a map according to an exemplary embodiment of the present invention.

A proportional correction coefficient may be calculated from the ratio of the distances between the hydraulic pressure at the star and the hydraulic pressure of a middle-quality product at about 40° C. and the hydraulic pressure of a low-quality product at about 40° C., the proportional correction coefficient may be applied to the values in the standard map for a low-quality electric oil pump and the standard map for a middle-quality electric oil pump of several standard maps prepared in advance, thereby generating a new learning map between the standard maps, as shown in FIG. 5.

Thereafter, when a vehicle operates normally, the electric oil pump may be based on the learning map, to operate the electric oil pump at the optimum RPM based on the electric oil pump performance without necessarily operating at a substantially high RPM. Therefore, power consumption may decrease, resulting improvement of the fuel efficiency of the vehicle. A greater number of and more detailed standard maps may be provided in advance; and specific standard maps for extreme situations may be added.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of controlling an oil pump, comprising:
   determining, by a controller, whether learning conditions for learning a necessary revolutions per minute (RPM) based on a quality of an electric oil pump are satisfied;
   operating, by the controller, the electric oil pump at an RPM for a standby state based on a current oil temperature, when the learning conditions are satisfied;
   measuring, by the controller, hydraulic pressure generated when the electric oil pump is operated at predetermined learning-objective RPM from the standby state generated in the operation of the electric oil pump; and
   generating, by the controller, a new learning map proportional to a difference between the hydraulic pressure measured in the measuring of hydraulic pressure and the hydraulic pressure of predetermined standard maps, by comparing the measured hydraulic pressure with the hydraulic pressure of the standard maps.

2. The method of claim 1, wherein a sensor is configured to measure hydraulic pressure generated by the electric oil pump in the measuring of hydraulic pressure and the sensor is a hydraulic pressure sensor configured to receive hydraulic pressure from the electric oil pump, is mounted on a hydraulic device operated at hydraulic pressure different from the hydraulic pressure discharged from the electric oil pump in operation, and is configured to sense control pressure of the hydraulic device that is in operation.

3. The method of claim 2, wherein in the determination of whether learning conditions are satisfied, the method includes:
   determining, by the controller, the pressure for operating the hydraulic device is not measure since the hydraulic pressure is not operated;
   determining, by the controller, whether oil temperature is within a predetermined range; and
   when the hydraulic pressure sensor is available for measuring pressure discharged from the electric oil pump and when the oil temperature is in the predetermined range, determining, by the controller, that the learning conditions are satisfied.

4. The method of claim 2, wherein in the operation of the electric oil pump at an RPM for a standby state, the RPM that corresponds to the current oil temperature is obtained from a first control map, in which the RPM for the standby state is set in advance for each temperature, and then the electric oil pump is operated; and
   in the measuring of oil temperature, the RPM that corresponds to the current oil temperature is obtained from a second control map, in which the learning-objective RPM is set in advance for each temperature, and then hydraulic pressure is measured while the electric oil pump is operated.

5. The method of claim 4, wherein the learning-objective RPM of the second control map is set to cause a middle-quality electric oil pump to generate hydraulic pressure for normal operation of the hydraulic device, at a predetermined temperature, and the RPM for the standby state of the first control map is set to measure hydraulic pressure with a distinct difference due to a change in RPM of the electric oil pump between the controlling of the electric oil pump at the RPM for a standby state and the measuring of hydraulic pressure.

6. The method of 2, wherein the hydraulic device is an engine clutch disposed on an input shaft of a transmission within a vehicle and is configured to continually transmit power from an engine and the hydraulic pressure sensor is configured to measure control hydraulic-pressure of the engine clutch.

7. The method of claim 6, wherein the transmission is supplied with necessary hydraulic pressure from the electric oil pump.

8. A system of controlling an oil pump, comprising:
a memory configured to store program instructions; and
a processor configured to execute the program instructions, the program instructions when executed configured to:
   determine whether learning conditions for learning a necessary revolutions per minute (RPM) based on a quality of an electric oil pump are satisfied;
   operate the electric oil pump at an RPM for a standby state based on a current oil temperature, when the learning conditions are satisfied;
   measure hydraulic pressure generated when the electric oil pump is operated at predetermined learning-objective RPM from the standby state generated in the operation of the electric oil pump; and
   generate a new learning map proportional to a difference between the hydraulic pressure measured in the measuring of hydraulic pressure and the hydraulic pressure of predetermined standard maps, by comparing the measured hydraulic pressure with the hydraulic pressure of the standard maps.

9. The system of claim 8, further comprising:
a sensor is configured to measure hydraulic pressure generated by the electric oil pump in the measuring of hydraulic pressure and the sensor is a hydraulic pressure sensor configured to receive hydraulic pressure from the electric oil pump, is mounted on a hydraulic device operated at hydraulic pressure different from the hydraulic pressure discharged from the electric oil pump in operation, and is configured to sense control pressure of the hydraulic device that is in operation.

10. The system of claim 9, wherein the program instructions when executed are further configured to:
   determine the pressure for operating the hydraulic device is not measure since the hydraulic pressure is not operated;
   determine whether oil temperature is within a predetermined range; and
when the hydraulic pressure sensor is available for measuring pressure discharged from the electric oil pump and when the oil temperature is in the predetermined range, determining, by the controller, that the learning conditions are satisfied.

11. The system of claim 9, wherein in the operation of the electric oil pump at an RPM for a standby state, the RPM that corresponds to the current oil temperature is obtained from a first control map, in which the RPM for the standby state is set in advance for each temperature, and then the electric oil pump is operated; and
   in the measuring of oil temperature, the RPM that corresponds to the current oil temperature is obtained from a second control map, in which the learning-objective RPM is set in advance for each temperature, and then hydraulic pressure is measured while the electric oil pump is operated.

12. The system of claim 11, wherein the learning-objective RPM of the second control map is set to cause a middle-quality electric oil pump to generate hydraulic pressure for normal operation of the hydraulic device, at a predetermined temperature, and
   the RPM for the standby state of the first control map is set to measure hydraulic pressure with a distinct difference due to a change in RPM of the electric oil pump between the controlling of the electric oil pump at the RPM for a standby state and the measuring of hydraulic pressure.

13. The system of claim 9, wherein the hydraulic device is an engine clutch disposed on an input shaft of a transmission within a vehicle and is configured to continually transmit power from an engine and the hydraulic pressure sensor is configured to measure control hydraulic-pressure of the engine clutch.

14. The system of claim 13, wherein the transmission is supplied with necessary hydraulic pressure from the electric oil pump.

* * * * *